United States Patent [19]

Atkins

[11] 4,374,215

[45] Feb. 15, 1983

[54] POLYESTER MOLDINGS

[75] Inventor: Kenneth E. Atkins, South Charleston, W. Va.

[73] Assignee: Union Carbide Corporation, Danbury, Conn.

[21] Appl. No.: 194,069

[22] Filed: Oct. 16, 1980

Related U.S. Application Data

[63] Continuation-in-part of Ser. No. 93,589, Nov. 13, 1979, abandoned.

[51] Int. Cl.$^3$ ............................................. C08L 67/00
[52] U.S. Cl. ................................... 523/514; 523/516; 523/523; 523/526; 523/527; 525/168; 525/169; 525/170; 525/171; 525/417; 525/438; 525/445; 527/311
[58] Field of Search ............... 525/165, 168, 169, 170, 525/171, 417, 438, 445; 260/40 R, 18, 3, 16; 523/514, 516, 523, 526, 527; 527/311

[56] References Cited

U.S. PATENT DOCUMENTS

| | | | |
|---|---|---|---|
| 2,851,379 | 9/1958 | Staundingler et al. | 427/392 |
| 3,503,921 | 3/1970 | Souza | 260/40 |
| 3,642,683 | 2/1972 | Fry et al. | 260/31.6 |
| 3,652,489 | 2/1972 | Fagor | 260/40 R |
| 3,700,624 | 10/1972 | Adzchi et al. | 260/31.6 |
| 3,701,748 | 10/1972 | Kroekel | 260/40 |
| 3,715,330 | 2/1973 | Nogami et al. | 525/165 |
| 3,721,722 | 3/1973 | Braum | 525/165 |
| 3,772,241 | 11/1973 | Kroekel | 260/40 R |
| 3,830,875 | 5/1974 | Meinele et al. | 525/165 |
| 3,852,376 | 12/1974 | Bando | 525/165 |
| 4,052,358 | 10/1977 | Wasa et al. | 260/40 R |
| 4,128,601 | 12/1978 | McCluskey | 260/40 R |

FOREIGN PATENT DOCUMENTS 1361841  7/1974  United Kingdom ............ 260/40 R

*Primary Examiner*—J. Ziegler
*Attorney, Agent, or Firm*—Donald M. Papuga

[57] ABSTRACT

The addition of a select group of crosslinkable vinyl monomers to low shrinking polyester molding compositions containing unsaturated polyesters results in moldings with improved surface characteristics.

18 Claims, No Drawings

POLYESTER MOLDINGS

This application is a Continuation-In-Part application of U.S. patent application Ser. No. 093,589, filed Nov. 13, 1979 now abandoned.

BACKGROUND OF THE INVENTION

This invention pertains to improved polyester moldings and more particularly to those having improved surface characteristics.

A technical improvement that has made a significant contribution to commercial polyester molding technology is the use of low profile additives to reduce shrinkage during the curing reaction, and to thereby improve dimensional stability and surface smoothness. Low profile additives are thermoplastic polymers such as vinyl acetate polymers, polystyrene, acrylic polymers, and polycaprolactones. There are a number of theories that seek to explain the low profile or anti-shrinkage action of these polymers, but the one that seems to best explain the phenomenon is the following:

The low profile additive is at least partly soluble in the uncured polyester/styrene solution. As the polyester/styrene mixture crosslinks, the thermoplastic polymer becomes incompatible or less soluble and at least partly comes out of solution. This action causes a volume expansion that compensates for the shrinkage that occurs when the polyester/styrene mixture crosslinks.

The development of low-profile unsaturated polyester compounds has led to a wide acceptance of these materials by the transportation industry because of their good surface appearance, dimensional stability, physical properties, assembly consolidation and potential weight savings. However, as new applications developed standards have been raised making it desirable for even better surface appearance and the elimination of ripples and waviness that sometimes develop, particularly in relatively large appearance sensitive areas.

There is, therefore, a need to provide low-profile unsaturated polyester compounds which afford improved surface appearance in the molded parts obtainable therefrom.

SUMMARY OF THE INVENTION

It has been found that polyester molding compositions meeting the above-described needs comprise:

(a) a polyester resin comprising the reaction product of an olefinically unsaturated dicarboxylic acid or anhydride and a polyol;

(b) an olefinically unsaturated monomer that is copolymerizable with said polyester resin;

(c) a thermoplastic polymer low-profile additive to control shrinkage; and (d) an effective amount of a secondary crosslinkable vinyl monomer having a reactivity ratio with styrene of greater than 1.

The polyesters that are employed in the invention include reaction products of a dicarboxylic acid or anhydride, with a polyhydric alcohol. The dicarboxylic acids or anhydrides that are employed to produce the polyester, either singly or in combination, must include those that contain olefinic unsaturation, preferably wherein the olefinic unsaturation is alpha, beta- to at least one of the carboxylic acid groups. Such acids include maleic acid or anhydride, fumaric acid, tetrahydrophthalic acid or anhydride, hexachloroendomethylene tetrahydrophthalic anhydride ("chlorendic anhydride"), Diels-Alder adducts of maleic acid or anhydride with compounds having conjugated olefinic unsaturation, such adducts being exemplified by bicyclo[2.2.1] hept-5-en3-2,3-dicarboxylic anhydride, methyl maleic acid, and itaconic acid. Maleic acid or anhydride and fumaric acid are the most widely used commercially.

In addition to the olefinically unsaturated acid or anhydride, saturated and/or aromatic dicarboxylic acids or anhydrides can also be employed in producing the polyester. Such acids include phthalic acid or anhydride, terephthalic acid, hexahydrophthalic acid or anhydride, adipic acid, isophthalic acid, and "dimer" acid (i.e., dimerized fatty acids).

In addition to the above esters one may also use dicyclopentadiene modified unsaturated polyester resins described in U.S. Pat. Nos. 3,986,922 and 3,883,612 incorporated herein by reference.

A polyol is also employed to produce the polyester. Such polyols include ethylene glycol, diethylene glycol, propylene glycol, dipropylene glycol, butylene glycols, neopentyl glycol, glycerol and 1,1,1-trimethylolpropane. As a rule, not more than about 20 mole percent of the polyol will be triol, with the remainder being one or more diols.

Vinyl ester resins that have been advantageously employed in both bulk molding compounds (BMC) and sheet molding compounds (SMC) are resins wherein the secondary hydroxyl group formed by the interaction of an epoxide group with a carboxylic acid group has been reacted with a dicarboxylic acid anhydride to produce pendant carboxylic acid groups. A variety of saturated and unsaturated anhydrides similar to those described as useful in preparing polyester resins may be used in proportions of at least about 0.1 mole of anhydride per equivalent of hydroxyl group up to an amount sufficient to react with each hydroxyl.

Thermosetting resins that are classified herein as vinyl ester resins, which contain the characteristic linkages and terminal, polymerizable unsaturated groups, are fully disclosed in U.S. Pat. No. 3,887,515 to Pennington et al along with the preparation of such resins and further description of these well known resins is unnecessary herein.

As is known in the art, polyesters that are employed in thickened molding compositions must contain residual acidity in order to enter into the thickening reaction. The nature and production of the polyesters used in such applications are known in the art.

The polyester composition of the invention also contains a monomer that contains ethylenic unsaturation, and which is copolymerizable with the polyester. Styrene is the preferred monomer in commercial practice today, although others can be used. Such others include vinyl toluene, methyl methacrylate, chlorostyrene, and the like.

The said monomer is employed in the polyester composition for the purpose of dissolving the polyester (which is a solid at ambient temperatures, i.e., about 20°–25° C.) to ensure that the polyester composition is a fluid. Enough monomer is employed so that the thickness or viscosity of the fluid is such that the fluid can be processed conveniently. Excessive amounts of the monomer are normally to be avoided, because such excess can have an adverse effect on properties. For instance, too much of the monomer may tend to cause embrittlement of the cured polyester. Within these guidelines, effective proportions of the monomer are normally found within the range of from about 35 to about 70, and preferably 40 to 55, weight percent based on weight of polyester plus monomer, plus low profile additive.

If a thickening agent is also employed in the invention, these materials are known in the art, and include the oxides and hydroxides of the metals of Groups I, II and III of the Periodic Table. Specific illustrative examples of thickening agents include magnesium oxide, calcium oxide, zinc oxide, barium oxide, calcium hydroxide, magnesium hydroxide, mixtures thereof and others known to the art. Thickening agents are normally employed in proportions of from about 0.1 to about 6 weight percent, based upon weight of polyester resin, plus monomer, plus low profile additive.

In one aspect, the invention employs a carboxylated vinyl acetate polymer low profile additive. Such polymers include copolymers of vinyl acetate and ethylenically unsaturated carboxylic acids such as acrylic acid, methacrylic acid, maleic acid, fumaric acid, itaconic acid, and the like; vinyl acetate/vinyl chloride/maleic acid terpolymer, and the like. Reference is made to Comstock et al., U.S. Pat. No. 3,718,714 and Comstock et al. British Pat. No. 1,361,841, for description of carboxylated vinyl acetate polymer low profile additives.

The useful carboxylated vinyl acetate polymer low profile additives ordinarily have molecular weights within the range of from about 10,000 to about 250,000, and preferably from about 25,000 to about 175,000. They are usually employed in proportions of from about 6 to 20, and preferably from about 9 to 16, weight percent, based on weight of polyester plus low profile additive, plus monomer.

As a general rule, the solution polymerized carboxylated vinyl acetate polymers are preferred in commercial practice because of their better batch-to-bath uniformity.

Other thermoplastic polymers useful as low profile additives include homopolymers and copolymers of acrylic and methacrylic acid esters, cellulose acetate butyrate, vinyl acetate homopolymers, polystyrene and styrene copolymerized with acrylates, methacrylates and butadiene, alkylene oxide polymers and copolymers poly(caprolactones) and saturated-poly esters.

The polyester molding composition may also contain one or more of the known types of conventional additives, which are employed for their known purposes in the usual amounts. The following are illustrative of such additives:

1. Polymerization initiators such as t-butyl hydroperoxide, t-butyl perbenzoate, benzoyl peroxide, cumene hydroperoxide, methyl ethyl ketone peroxide, and others known to the art. The polymerization initiator is employed in a catalytically effective amount, such as from about 0.3 to about 2 to 3 weight percent, based on the weight of polyester plus monomer plus low profile additive;

2. Fillers such as clay, hydrated alumina, silica, calcium carbonate and others known to the art;

3. Reinforcing fillers such as glass fibers or fabrics, asbestos fibers or fabrics, various organic fibers or fabrics such as those made of polypropylene, acrylonitrile/vinyl chloride copolymer, and others known to the art; and 4. Mold release agents or lubricants, such as zinc stearate, calcium stearate, and others known to the art.

5. Rubbers or elastomers such as (a): homopolymers or copolymers of conjugated dienes having a weight average molecular weight of 30,000 to 400,000 or higher as described in U.S. Pat. No. 4,020,036. The conjugated dienes contain from 4–12 carbon atoms per molecule such as 1,3-butadiene, isoprene, and the like; (b) epihalohydrin homopolymers, a copolymer of two or more epihalohydrin monomer(s), or a copolymer of an eiphalohydrin monomer(s) with an oxide monomer(s) having a number average molecular weight (Mn) which varies from about 800 to about 50,000 as described in U.S. Pat. No. 4,101,604; (c) chloroprene polymers including homopolymers of chloroprene and copolymers of chloroprene with sulfur and/or with at least one copolymerizable organic monomer wherein chloroprene constitutes at least 50 weight percent of the organic monomer make-up of the copolymer as described in U.S. Pat. No. 4,161,471; (d) hydrocarbon polymers including ethylene/propylene dipolymers and copolymers of ethylene/propylene and at least one nonconjugated diene, such as ethylene/propylene/hexadiene terpolymers and ethylene/propylene/1,4-hexadiene/norbornadiene, as described in U.S. Pat. No. 4,161,471; (e) conjugated diene butyl elastomers, such as copolymers consisting of from 85 to 99.5% by weight of a $C_4$-$C_7$ isolefin combined with 15 to 0.5% by weight of a conjugated multi-olefin having 4 to 14 carbon atoms, copolymers of isobutylene and isoprene where a major portion of the isoprene units combined therein have conjugated diene unsaturation as described in U.S. Pat. No. 4,160,759.

The polyester molding compositions of the invention can be cured under conditions similar to those used for known polyester compositions. Typical curing conditions are a temperature of from about 200° to 350° F. for 1 to 4 minutes at a pressure of 300 to 2000 psi.

Although relatively low levels, that is one to about six parts of secondary crosslinkable monomer per hundred of the total composition of polyester resin, thermoplastic polymer and monomer, are effective in producing molded parts with better surface appearance than heretofore available, somewhat larger amounts can be used if desired, i.e., up to about 10 parts per hundred. Above this level, however, surface characteristics of molded parts are inferior to those using a monomer such as styrene alone.

The secondary crosslinkable monomer suitable for use in the present invention has a reactivity ratio with styrene of greater than 1, preferably greater than 5, and most preferably greater than 20.

Measuring the reactivity ratios of monomers is well known in the art as described, for example, in F. W. Billmeyer, Jr., *Textbook of Polymer Science*, Wiley-Interscience, pages 329–331.

The monomer reactivity ratios $r_1$ and $r_2$ are the ratios of the rate constant for a given radical adding its own monomer to that for its adding the other monomer. Thus $r_1 > 1$ means that the radical $M_1$ prefers to add $M_1$; $r_1 < 1$ means that it prefers to add $M_2$. In the system styrene ($M_1$)-methyl methacrylate ($M_2$), for example, $r_1 = 0.52$ and $r_2 = 0.46$; each radical adds the other monomer about twice as fast as its own. Thus, methyl methacrylate is unsatisfactory in the molding compositions of this invention.

The following Table lists representative styrene-monomer reactivity ratios.

| Monomer-1 | Monomer-2 | $r_1$ | $r_2$ |
|---|---|---|---|
| Styrene | Diethylfumarate | 0.30 | 0.07 |
|  | Diethylfumarate | 0.400 | 0.0905 |

-continued

| Monomer-1 | Monomer-2 | $r_1$ | $r_2$ |
|---|---|---|---|
| | Methyl Methacrylate | 0.52 | 0.46 |
| | Methyl Methacrylate | 0.59 | 0.536 |
| | Vinyl Acetate | 55 | 0.01 |
| | Vinyl Methyl Ether | 100 | 0.01 |
| | Vinyl Ethyl Ether | 90 | 0 |
| | Vinyl Nonanoate | 49.5 | 0.01 |
| | Vinyl Octadecanate | 68 | 0.01 |
| | Vinyl Stearate | 68 | 0.01 |
| | Vinyl Undecanoate | 29 | 0.02 |
| | Allyl Acetate | 90 | 0.00 |
| | Diallylphthalate | 328 | 0.057 |
| | Diethyl maleate | 6.52 | 0.005 |
| | Ethyl 2-Ethoxyacrylate | 23.5 | ~0 |
| | Vinyl trimethoxysilane | 22 | 0 |

Other monomers suitable for use in this invention include vinyl norbornene, vinyl stearate, butyl vinyl ether, diallyl phthalate, octene-1, octene-2, vinyl cyclohexene, bicyclononadiene, dicyclopentadiene, and the following:

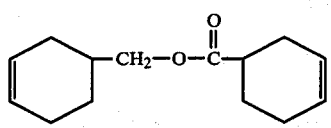

The invention is further described in the examples which follow. All parts and percentages are by weight unless otherwise specified.

In formulating the compositions of this invention which are to be used in molding applications including both sheet molding and bulk molding, it is customary to admix with the unsaturated polyesters and the low-profile additives the following materials:
1. A polymerizable ethylenically unsaturated monomer which serves to crosslink the unsaturated polyester to a thermoset product.
2. A peroxide which serves to accelerate the crosslinking reaction.
3. A thickening agent which serves to provide body to the compositions by increasing the viscosity of the polyester.
4. Fillers, including fillers which serve as reinforcing agents such as glassfibers and the like.

The compositions of this invention can be prepared by mixing the components in a suitable apparatus such as a Hobart mixer, at temperatures in the order of about 20° C. to about 50° C. The components may be combined in any convenient order. Generally, it is preferable that the thermosetting resin and low-profile additive are added in liquid form by preparing a solution thereof in styrene or other liquid copolymerizable monomer. All the liquid components are usually mixed together including the crosslinkable vinyl monomers of this invention before adding the fillers and thickening agent.

Once formulated, the compositions can be molded into thermoset articles of desired shape, particularly thermoset articles such as automobile fenders, dashboards and the like. The actual molding cycle will, of course, depend upon the exact composition being molded as well as upon the nature of a particular cured product desired. Suitable moldings cycles are conducted at temperatures of the order of about 100° C. to about 182° C. for periods of time ranging from about 0.5 minutes to about 5 minutes.

The shrinkage data molding conditions for making 12"×12"×⅛" plaques were two minutes at 148° C. and 800 psi unless otherwise.

The molding viscosities were measured on paste samples containing all of the ingredients except the fiberglass using a Brookfield HBT 5X Viscometer TF spindle at 5 rpm.

EXPERIMENTAL SECTION

General Procedure for Preparation of Bulk Molding Compound (BMC) Formulations

All the liquid components were weighed individually into a Hobart mixing pan placed on a Toledo balance. The pan was attached to a Model C-100 Hobart mixer (in a hood). The agitator was started at slow speed, then increased to medium speed to completely mix the liquids over a period of 3–5 minutes. The agitator was then stopped and the internal mold release agent was next added to the liquid from an ice cream carton. The Hobart mixer was restarted and the mold release agent mixed with the liquid until it was completely wet out. The filler was next added to the pan contents (agitator off) then mixed, using medium to high speed, until a consistent paste was obtained. The mixer was again stopped and the weighed amount of thickening agent was mixed into the paste over a period of 2–3 minutes, the mixer was again stopped and ~175 grams of the paste were removed from the pan (using a large spatula) and transferred to a wide-mouthed 4 oz. bottle. This paste sample was stored in the capped bottle at room temperature and the viscosity was measured periodically using a Model HBT 5X Brookfield Synchro-Lectric Viscometer on a Helipath Stand.

After removal of the paste sample, the contents were reweighed and styrene loss made up, the chopped glass fibers were added slowly (from an ice cream carton) to the pan with the mixer running on slow speed. The mixer was run for ~30 seconds after all the glass was in the paste. This short time gave glass wet out without glass degradation. The pan was then removed from the mixer and separate portions of the BMC mix of ~450 grams each were removed using spatulas and transferred to aluminum foil lying on a balance pan (balance in the hood). The mix was tightly wrapped in the aluminum foil (to prevent loss of styrene via evaporation) and stored at room temperature until the viscosity of the retained paste sample reached molding viscosity. The weight of the BMC added to the foil varies with the molding application.

General Procedure for Preparation of Sheet Molding Compound (SMC) Formulations

All the liquid components were weighed individually into a 5 gallon open top container placed on a Toledo balance. The contents of the container were then mixed (in a hood) with a high speed Cowles type dissolver. The agitator was started at a slow speed, then increased to medium speed to completely mix the liquids over a period of 2–3 minutes. The mold release agent, if one is desired, was next added to the liquids from an ice cream carton and mixed until completely dispersed. The filler was next added gradually from a tared container until a consistent paste was obtained and the contents were then further mixed to a minimum temperature of 90° F. The thickener was next mixed into the paste over a period of 2–3 minutes, the mixer was stopped and ~175 grams of the paste was removed from the container and transferred to a wide-mouthed 4 oz. bottle. The paste sample was stored in the capped bottle at room temperature and the viscosity measured periodically using a Model HBT 5X Brookfield Synchro-Lectric Viscometer on a Helipath Stand.

The balance of the paste is next added to the doctor boxes on the SMC machine where it is further combined with fiber glass (~1" fibers). The sheet molding compound (SMC) is then allowed to mature to molding viscosity and then molded into the desired article.

MOLDING FACILITIES

12"×12"×⅛" text panels

Flat panels for MCR surface evaluation are molded on a 75 TON Queens Hydraulic press. The press contains a matched dye set of 12"×12" chrome plated molds. The female cavity is installed in the bottom and the male portion is at the top. Both molds are electrically heated and are controlled on separate circuits so that the molds can be operated at different temperatures. For our molding the top and bottom temperature was 300° F. The molding pressure which can be varied from 0–75 TON was run at maximum pressure. The molds do not contain ejector pins; therefore, the molded panel is removed with a rubber suction cup and the use of a stream of air. The panels are laid on a flat surface, weighted to keep them flat and allowed to cool overnight. The molded panel is measured with a micro caliper from corner to corner in all four directions to determine shrinkage which is an average of the four readings. These panels are also used for surface smoothness determinations with the Bendix Profilometer.

Hood Scoops

Hood Scoops designed like miniature automobile hoods and containing a number of ribs and bosses of varying sizes was used to determine "sink", surface smoothness and overall moldability of sheet molding compound formulations containing surface improvers. The hood scoop contains a large triangular boss (~1.9" base ~3.8" high) and 3 circular bosses (~0.4", ~0.9", ~1.4" diameter). It also contains a number of ribs of varying thickness and with different lead in radii.

Visual observations of these hood scoops as molded and after painting with a gloss black paint enables one to compare "sink" over the ribs and bosses, craze cracking, surface smoothness, glass pattern, laking and overall moldability. The hood scoop mold is installed in a 200 Ton Lawton hydraulic press. The molds contain ejector pins for release of the molded part and are heated with circulating oil. The male core is installed in the bottom of the press and the female cavity at the top. Temperatures of the two molds are controlled separately. Pressure of the press can be varied up to 200 Ton with variable time cycles so that the same part can be molded at several pressures. The speed at which the press closes can also be varied as well as the cure cycle for the molded part. All of these were varied during the molding of SMC formulations containing the surface improvers. Placement of the change pattern on the male core mold was also varied. The molded hood scoop was allowed to cool and was then evaluated.

Transfer Molding Press—Tree Mold

The molding press used is a 100 ton hydraulic press with an 18"×12" platen area. The press contains a tree mold. The tree mold has a number of cavities of varying length, shapes, and thickness. In molding the part a 180 g. charge of sheet molding compound (SMC) or bulk molding compound (BMC) is added to the ram port. The ram piston which has an adjustable pressure range of 0–2000 psi then pushes the charge into the tree mold cavities where it is cured. The gate sizes going into each cavity is 64 mm while the feed lines are approximately 126 mm.

METHOD OF SHRINKAGE MEASUREMENT

A 12"×12"×⅛" flat panel is molded in a highly polished chrome plated matched metal die mold in a 75 TON Queens Hydraulic press. The exact dimensions of the four sides of this mold are measured to the ten-thousandths of an inch at room temperature. The exact length of the four sides of the flat molded panel is also determined to the ten thousandths of an inch. These measurements are substituted into the equation below:

$$(a-b)/a = \text{inch/inch shrinkage}$$

inch/inch shrinkage × 1000 = mils/inch shrinkage.

a = the sum of the lengths of the four sides of the mold.

b = the sum of the lengths of the four sides of the molded panel.

PROCEDURE FOR MCR MEASUREMENTS

Surface evaluations of molded fiber reinforced plastic (FRP) parts were obtained as follows:

A Bendix Profilometer or microrecorder was used to determine the surface smoothness of 12"×12" panels molded from the various SMC formulations. A diamond stylus connected to the Bendix Profilometer passes over the surface of the panels, measuring the hills and valleys. These recorded surface variations are averaged to give the MCR reading (micro inches/inch) recorded in the report.

EXAMPLE 1

Possible changes in shrinkage control (which normally correlates to surface appearance) by means of a low reinforcement LP-40A based critical shrinkage control test utilizing vinyl acetate monomer as the crosslinkable monomer additive was carried out as shown in Table I with different formulations. The results of these variations are shown in Table I as well as where it can be seen that vinyl acetate monomer improved the shrinkage control from 1.0 mils per inch to 0.4 mils per inch over a range of 1 to 5 parts per hundred to resin of vinyl acetate monomer.

In all of the tables all materials listed are parts by weight except for the fiberglass reinforcement, which is expressed as a weight percent of the total mix.

TABLE I

| CRITICAL BMC SHRINKAGE CONTROL TEST | | | | |
|---|---|---|---|---|
|  | (1) | (2) | (3) | (4) |
| Freeman Stypol 2955 | 60 | → | → | → |
| BAKELITE LP-40A | 30 | → | → | → |
| Vinyl Acetate | — | 1 | 3 | 5 |
| Styrene | 10 | → | → | → |
| Snowflake | 175 | → | → | → |
| Zinc Stearate | 4 | → | → | → |
| TBPB | 1.5 | → | → | → |
| Modifier M | 3.0 | → | → | → |
| Glass, ¼" (Wt. %) | 10 | → | → | → |
| JM-308A |  |  |  |  |

Molded 300° F./75 Tons - 3 Minutes

TABLE I-continued

| CRITICAL BMC SHRINKAGE CONTROL TEST | | | | |
|---|---|---|---|---|
| | (1) | (2) | (3) | (4) |
| Shrinkage, mils/inch | 1.0 | 0.8 | 0.6 | 0.4 |

EXAMPLE 2

Further tests were run on a similar formula shown in Table II. Monomers such as diallyl phthalate. methyl methacrylate, vinyl norbornene, vinyl stearate, and butyl vinyl ether were examined at levels of 2.75 and 5.5 parts per 100 of resin. In all cases except methyl methacrylate, which is known to react readily with the polyester/styrene materials, improvements in shrinkage control were observed. Particularly good results were observed with the vinyl norbornene and vinyl stearate.

EXAMPLE 3

Other bulk molding compound formulations were run with two other thermoplastic shrinkage control agents, Bakelite LP-100 and LP-60 low profile additives to determine the effect of crosslinkable monomers on shrinkage control and pigmentability. These data are shown in Table III. In the LP-60 system (40% by weight solution of a polycaprolactone of about 5000 molecular weight end-capped with phthalic anhydride, described in U.S. Pat. No. 3,668,178 incorporated herein by reference) vinyl stearate and butyl vinyl ether improved shrinkage control but not pigmentability. With LP-100 (40% solution of vinyl acetate copolymer in styrene), vinyl acetate, vinyl stearate, and butyl vinyl ether all improved shrinkage control. The butyl vinyl ether also improved pigmentability.

TABLE II

BULK MOLDING COMPOUND CRITICAL SHRINK EVALUATION USING VARIOUS UNSATURATED MONOMERS AS ADDITIVES

| | 1 | 2 | 3 | 4 | 5 | 6 | 7 | 8 | 9 | 10 |
|---|---|---|---|---|---|---|---|---|---|---|
| Formulation (Parts by weight) | | | | | | | | | | |
| NR-3929 | 52.25 | → | → | → | → | 49.5 | → | → | → | 55 |
| Bakelite LP-40A | 40 | → | → | → | → | → | → | → | → | 40 |
| PBQ* | 100ppm | → | → | → | → | → | → | → | → | — |
| Styrene | 5 | → | → | → | → | → | → | → | → | 5 |
| Diallyl Phthalate | 2.75 | — | — | — | — | 5.5 | — | — | — | — |
| Methyl Methacrylate | — | 2.75 | — | — | — | — | 5.5 | — | — | — |
| Vinyl Norbornene | — | — | 2.75 | — | — | — | — | 5.5 | — | — |
| Vinyl Stearate | — | — | — | 2.75 | — | — | — | — | — | — |
| Butyl Vinyl Ether | — | — | — | — | 2.75 | — | — | — | 5.5 | — |
| Snowflake | 150 | → | → | → | → | → | → | → | → | 150 |
| TBPB | 0.5 | → | → | → | → | → | → | → | → | 0.5 |
| PDO (50%) | 1.0 | → | → | → | → | → | → | → | → | 1.0 |
| Zinc Stearate | 2 | → | → | → | → | → | → | → | → | 2 |
| Bakelite VR-3 | 2 | → | → | → | → | → | → | → | → | 2 |
| Modifier M | 3 | → | → | → | → | → | → | → | → | 3 |
| H$_2$O | 0.05 | → | → | → | → | → | → | → | → | 0.05 |
| JM-308A, ¼", Wt. % | 10 | → | → | → | → | → | → | → | → | 10 |
| Viscosity, cps | | | | | | | | | | |
| 1 Day, MM | 7.2 | 8.0 | 4.8 | 19.4 | 12.0 | — | — | — | 8.8 | — |
| 2 Days, MM | — | — | — | — | — | — | — | — | — | — |
| 3 Days, MM | — | — | — | — | — | — | — | — | — | — |
| 4 Days, MM | 49.2 | 46.4 | 42.4 | — | — | 47.2 | 36.0 | 30.4 | — | 30.4 | 24.0 |
| Shrinkage, mils/inch | 0.56 | 0.98 | 0.21 | 0 | 0 | 0 | 0.83 | +0.4 | +0.58 | 0 | 0.88 |
| Comments | | | | | | | | | Scums on Mold | | Control |

*Based on NR-3929

TABLE III

PIGMENTABILITY AND SHRINKAGE CONTROL OF LP-60 AND LP-100 BMC SYSTEMS USING VARIOUS MONOMERS

| RUN NO. | 1A | 2 | 3 | 4 | 5 | 6 | 7 | 8 | 9 | 10 |
|---|---|---|---|---|---|---|---|---|---|---|
| Formulation | | | | | | | | | | |
| NR-3929 | 60 | → | → | → | → | → | → | → | → | → |
| LP-60 | 35 | → | → | — | — | — | — | — | — | — |
| LP-100 | — | — | — | 35 | — | — | — | — | — | — |
| Styrene | 5 | → | → | — | → | → | → | → | → | → |
| Vinyl Acetate | — | — | — | 3 | 6 | — | — | — | — | — |
| Vinyl Stearate | — | 3 | — | — | — | 3 | 6 | — | — | — |
| Butyl Vinyl Ether | — | — | 3 | — | — | — | — | 3 | 6 | — |
| Snowflake | 150 | → | → | → | → | → | → | → | → | → |
| TBPB$^{(5)}$ | 1 | → | → | → | → | → | → | → | → | → |
| Zinc Stearate | 4 | → | → | → | → | → | → | → | → | → |
| BAKELITE LP-100 Part B (50% in styrene) | — | — | — | 3 | → | → | → | → | → | → |
| CM-2215 Pigment | 7 | → | → | → | → | → | → | → | → | → |
| Modifier M | 2.4 | → | → | → | → | → | → | → | → | → |
| JM-308A, ¼", Wt. % | 15 | → | → | → | → | → | → | → | → | → |
| Viscosity, cps | | | | | | | | | | |
| 1 Day, MM cps | 3.7 | — | — | 46.4 | 44.8 | 43.2 | 40.0 | 40.0 | 37.6 | 44.0 |

TABLE III-continued

PIGMENTABILITY AND SHRINKAGE CONTROL OF LP-60 AND LP-100 BMC SYSTEMS USING VARIOUS MONOMERS

| RUN NO. | 1A | 2 | 3 | 4 | 5 | 6 | 7 | 8 | 9 | 10 |
|---|---|---|---|---|---|---|---|---|---|---|
| 2 Days, MM cps | 10.8 | 5.6 | 8.5 | — | — | — | — | — | — | — |
| Physical Properties | | | | | | | | | | |
| Shrinkage, mils/inch | 0.42 | 0 | 0 | 0.71 | 0.42 | 0 | +0.35 | 0 | 0.21 | 1.08 |
| Pigmentation Rating (1 = best; 3 = worst) | 3 | 3 | 3 | 2 | 3 | 3 | 3 | 1 | 3 | 2 |

EXAMPLE 4

Further tests were run using USS MR 13031 polyester resin. Monomers such as vinyl cyclohexene, bicyclononadiene, octene-1, octene-2, dimethyl maleate and dimethyl fumarate.

TABLE IV

| Formulation | Run No. | | | | | | |
|---|---|---|---|---|---|---|---|
| | 1 | 2 | 3 | 4 | 5 | 6 | 7 |
| USS MR 13031 | 65 | 65 | 65 | 65 | 65 | 65 | 65 |
| LP-40A | 35 | 35 | 35 | 35 | 35 | 35 | 35 |
| TBPB | 1.5 | 1.5 | 1.5 | 1.5 | 1.5 | 1.5 | 1.5 |
| Zinc Stearate | 2 | 2 | 2 | 2 | 2 | 2 | 2 |
| VR-3 | 2 | 2 | 2 | 2 | 2 | 2 | 2 |
| Vinyl Cyclohexene | — | 2.75 | — | — | — | — | — |
| Bicyclononadiene | — | — | 2.75 | — | — | — | — |
| Octene-1 | — | — | — | 2.75 | — | — | — |
| Octene-2 | — | — | — | — | 2.75 | — | — |
| Dimethyl Maleate | — | — | — | — | — | 2.75 | — |
| Diethyl Fumarate | — | — | — | — | — | — | 2.75 |
| Modifier M[1] | 3 | 3 | 3 | 3 | 3 | 3 | 3 |
| ¼" Glass (Wt. %) | 10 | 10 | 10 | 10 | 10 | 10 | 10 |
| Molding Viscosity, Brookfield HBT-5X TF-5, MM cps | 25.1 | 24.0 | 22.0 | 24.0 | 23.6 | 21.6 | 22.4 |
| Shrinkage, mils/inch | 0.83 | 0.29 | 0.45 | 0.0 | 0.0 | 0.47 | 0.93 |
| Molding Conditions: 450 g/300° F./3 minutes/75 tons | | | | | | | |

[1] = MgO dispersion (33%)

EXAMPLE 5

Further tests were run using Freeman Stypol 40-2955 polyester resin and Diene 221 monomer.

TABLE V

| Formulation | Run No. | | |
|---|---|---|---|
| | 1 | 2 | 3 |
| Freeman Stypol 40-2955 | 65 | 65 | 65 |
| LP-40A | 35 | 35 | 35 |
| Diene 221 | — | 3 | 6 |
| Snowflake | 150 | 150 | 150 |
| t-Butyl Perbenzoate | 1.5 | 1.5 | 1.5 |
| Zinc Stearate | 4 | 4 | 4 |
| USS Modifier M | 3 | 3 | 3 |
| ¼" Glass (Wt. %) | 10 | 10 | 10 |
| Molding Viscosity, MM cps | 35 | 32 | 24 |
| Shrinkage, mils/inch | 1.04 | 0.3 | 0.2 |
| % H₂O Absorption | | | |
| 24 Hrs. | — | 0.41 | 0.53 |
| 7 Days | — | 1.03 | 1.36 |
| Molding Parameters (12" × 12" × 0.1") 2 mins/300° F./75 tons | | | |

EXAMPLE 6

Sheet molding compound runs were also made with a polyester molding composition containing in addition vinyl acetate monomer. These formulations are depicted in Table IV. Surface appearance was rated visually on complex hood scoop moldings after coating with a high gloss black paint as described earlier. In every case the use of vinyl acetate monomer improved the surface appearance.

TABLE VI

| SMC FORMULATIONS | | | | |
|---|---|---|---|---|
| | 1 | 2 | 3 | 4 |
| USS-MR-13031 | 65 | → | → | → |
| LP-40A | 28 | → | → | → |
| Vinyl Acetate | — | 1 | 2 | 4 |
| Snowflake | 142 | → | → | → |
| BAKELITE VR-3 | 2 | → | → | → |
| Zinc Stearate | 2 | → | → | → |
| TBPB | 0.75 | → | → | → |
| PDO (50%) | 1.50 | → | → | → |
| "B" Side[1] | 22.1 | → | → | → |
| OCF - 951; Weight % 1" | →Approximately 28→ | | | |
| Molding Viscosity, MM cps, Brookfield HBT-5X/TF/5 cpm | 20.0 | 24.0 | 19.6 | 18.4 |
| Shrinkage, mils/in. | 0.0 | 0.0 | 0.0 | 0.0 |
| Painted Hood Scoop: Surface Rating[2] | | | | |
| 800g/285° F./90 sec/1000 psi | 2− | 3+ | — | 2+ |
| 880g/300° F./90 sec/1000 psi | 3−3+ | 3+−4− | 3+ | 4 |

[1] Based on (Wt. %) Merck Maglite A (MgO)-5, BAKELITE LP-85-50, Snowflake 42, and PDI-1803-3 as a predispersion.
[2] Highest number is best.

EXAMPLE 7

Additional runs were made with vinyl acetate monomer on a transfer press for molding complex shapes. This is a chrome plated match metal die type mold. The formulations employed are shown in Table V together with viscosity and shrinkage results. The materials used are identified in Table VI. The profilometer evaluations of four inch discs transfer molding runs are presented in Table VII. The lower number obtained for Run 1 using vinyl acetate vis-à-vis the Control clearly indicates the smoother surface obtained.

TABLE VII

BULK MOLDING COMPOUND
CRITICAL SHRINK EVALUATION OF VARIOUS MONOMERS
IN AN ACRYLIC THERMOPLASTIC FORMULATION

| Formulation | Run No. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| NR-3529 | 60 | → | → | → | → | → | → | → | → | → | → | → | → |
| P-701 | 40 | → | → | → | → | → | → | → | → | → | → | → | → |

TABLE VII-continued
BULK MOLDING COMPOUND
CRITICAL SHRINK EVALUATION OF VARIOUS MONOMERS
IN AN ACRYLIC THERMOPLASTIC FORMULATION

| Formulation | Run No. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Vinyl Acetate | — | 2.75 | — | — | — | — | — | 5.5 | — | — | — | — | — |
| Diallyl Phthalate | — | — | 2.75 | — | — | — | — | — | 5.5 | — | — | — | — |
| Methyl Methacrylate | — | — | — | 2.75 | — | — | — | — | — | 5.5 | — | — | — |
| Vinyl Norbornene | — | — | — | — | 2.75 | — | — | — | — | — | 5.5 | — | — |
| Vinyl Stearate | — | — | — | — | — | 2.75 | — | — | — | — | — | 5.5 | — |
| Butyl Vinyl Ether | — | — | — | — | — | — | 2.75 | — | — | — | — | — | 5.5 |
| Snowflake | 150 | → | → | → | → | → | → | → | → | → | → | → | → |
| TBPB | 1.0 | → | → | → | → | → | → | → | → | → | → | → | → |
| Zinc Stearate | 4 | → | → | → | → | → | → | → | → | → | → | → | → |
| Modifier M | 2.5 | → | → | → | → | → | → | → | → | → | → | → | → |
| JM-308A, ¼", Wt. % | 10 | → | → | → | → | → | → | → | → | → | → | → | → |
| Viscosity, cps | | | | | | | | | | | | | |
| 1 Day, MMcps | 16.0 | 13.6 | 7.2 | 21.2 | 17.6 | 18.4 | 16.0 | 21.6 | 15.2 | 15.2 | 9.6 | 12.8 | 8.0 |
| 2 Days, MMcps | — | — | 15.2 | — | — | — | — | — | — | — | 21.2 | 20.8 | 21.6 |
| Shrinkage, mils/inch | 1.9 | 1.7 | 1.6 | 2.0 | 1.19 | 1.13 | 1.3 | 1.5 | 1.4 | 2.0 | 0. | 0 | 0.71 |

TABLE VIII
Description of Materials

Freeman Stypol 2955. An unsaturated polyester resin from Freeman Chemical Company which is a high reactivity isophthalic acid modified resin containing approximately 35 weight percent of styrene monomer.

BAKELITE LP-40A. A product of Union Carbide Corporation which is a copolymer of vinyl acetate and acrylic acid (40 weight percent) dissolved in styrene (60 weight percent).

Snowflake. A calcium carbonate filler sold by Thompson-Weimann, Inc. having a mean particle size of 5 microns.

TBPB. tert-butylperbenzoate.

Modifier M. A 33 weight percent dispersion of magnesium oxide in an unsaturated polyester carrier vehicle sold by USS Chemicals/Polyester Unit.

NR-3929. A high reactivity isophthalic acid modified unsaturated polyester resin containing approximately 35 weight percent of styrene and sold by Rockwell International.

PBQ. Parabenzoquinone.

PDO. A 50% dispersion of tert-butylperoctoate in dioctyl phthalate sold by the Lucidol Division of Penwalt Corp.

BAKELITE VR-3. A mixture of commerial fatty acids sold by Union Carbide Corporation.

JM 308. A sized fiberglass reinforcement of ¼" length sold by Johns Manville Corp.

CM-2015. A black pigment dispersion provided by Plasticolors, Inc.

PPG-3029. A sized, chopped fiberglass reinforcement supplied by PPG Industries.

BAKELITE LP-85. A 40 weight percent solution of poly(vinyl acetate) in styrene sold by the Union Carbide Corporation.

P-701. A 33 weight percent solution in styrene of a methyl methacrylate based thermoplastic polymer sold by Rohm and Haas.

NR-3529. An unsaturated polyester resin made by the condensation of 1.0 mole of maleic anhydride and 1.1 moles of propylene glycol and containing approximately 33 weight percent of styrene and manufactured by Rockwell International.

MR-13031. A highly reactive unsaturated polyester resin believed to be ortho-phthalic anhydride modified containing approximately 40 weight percent of styrene sold by USS Chemicals Polyester Unit.

OCF-951. A fiberglass roving chopped to desired length on the sheet molding compound machine and sold by Owens Corning Fiberglass Corp.

BAKELITE LP-100 Part B. A proprietary anionic surface active agent sold by Union Carbide Corporation.

Camel Wite. A finely divided calcium carbonate filler of average diameter size of 2.5 microns supplied by H. T. Campbell.

PDI 1803. A black pigment dispersion sold by Pigment Dispersions, Inc.

PG-9089. A thickener dispersion containing a ratio of 3.75 parts magnesium hydroxide and 1.0 parts of Ca-(OH)$_2$ at approximately 28 weight percent solids supplied by Plasticolors, Inc.

Merck Marinco H. A grade of magnesium hydroxide supplied by Merck and Company.

BAKELITE LP-60. A 40 weight percent solution in styrene of a phthalic anhydride capped poly(caprolactone) polymer sold by Union Carbide.

BAKELITE LP-100. A 40 weight percent solution in styrene of a proprietory vinyl acetate based polymer sold by Union Carbide.

Diene 221.

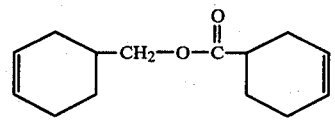

TABLE IX

| TRANSFER MOLDING RUNS | | |
|---|---|---|
| RUN | CONTROL | 1 |
| USS MR-13031 | 60 | 60 |
| BAKELITE LP-40A | 40 | 40 |
| Vinyl Acetate | — | 3 |
| Camel Wite | 140 | 140 |
| ASP-400 | 21 | 21 |
| Zinc Stearate | 4 | 4 |
| TBPB | 1.5 | 1.5 |
| PBQ | 0.02 | 0.02 |
| PDI 1803 | 0.3 | 0.3 |
| PG 9089 | 20.0 | 20.0 |
| PPG-3029 (Wt. %) | 20 | 20 |
| ¼" Fibers | | |
| Profilometer | | |

TABLE IX-continued

| | TRANSFER MOLDING RUNS | |
|---|---|---|
| RUN | CONTROL | 1 |
| MCR | 50 | 31 |
| Tensile Strength, psi | 4,200 | 4,500 |

EXAMPLE 8

The criticality of the upper level of the amount of secondary vinyl monomer used in this invention is demonstrated by the formulations and Control presented in Table VIII. It can be seen here that while 35 parts by weight of LP-40A alone affords cured surfaces with satisfactory surface ratings, the inclusion of the secondary vinyl monomers vinyl acetate and diallyl phthalate at a level of 21 parts produced cured surfaces with inferior ratings vis-à-vis the Control.

TABLE X
EVALUATION OF LPS-40A DISSOLVED IN VINYL ACETATE AND DIALLYL PHTHALATE

| | CONTROL | A | B |
|---|---|---|---|
| USS-13031 | 65 | 65 | 65 |
| LP-40A | 35 | 35 LPS40A/VAc | 35 LPS40A/DAP |
| Snowflake | 150 | 150 | 150 |
| TBPB | 1.5 | 1.5 | 1.5 |
| Zinc Stearate | 4 | 4 | 4 |
| Modifier M | 2.2 | 2.2 | 2.2 |
| OCF-951 wt. % | 27.4 | 25.0 | 25.1 |
| Hood Scoop Painted Surface Rating | | | |
| 1000 psi | 3 | 2− | 2 |
| 500 psi | 3+ | 2− | 2+ |
| Second Monomer Level (phr) | — | 21 | 21 |

DAP = diallyl phthalate monomer.
VAc = vinyl acetate monomer.
LPS-40A is the vinyl acetate/acrylic acid copolymer thermoplastic dissolved (40%) in styrene (60%) to form LP-40A. In A above 40% LPS-40A is dissolved in 60% vinyl acetate monomer. In B above 40% LPS-40A is dissolved in 60% diallylphthalate.
Cure conditions for SMC were 800 g charge at 300° F. for 2 minutes at the molding pressure indicated.

EXAMPLE 9

In order to distinguish the composition disclosed in U.S. Pat. No. 3,830,875 from the claimed invention, Example 3 of U.S. Pat. No. 3,830,875 and a comparative example were run as closely as possible to each other. In this reference the low profile additive used is a mixture of polystyrene and polyethylene. Repeating this Example using vinyl acetate as an additional monomer in the conventional polyester heat-curable composition, the surface values shown in Table IX were inferior to a composition where the vinyl acetate was omitted. This demonstrates that the use of vinyl acetate as a secondary vinyl monomer is only effective when used in the compositions of the instant invention.

TABLE XI

| | Patent Example 3* | 1 |
|---|---|---|
| PPG-50239 | 154 | — |
| Polystyrene in Styrene (35%) | 39 | — |
| Ionol | 0.8 | — |
| PDO (50%) | 8 | — |
| Zinc Stearate | 8 | |
| Microthene FN-510 | 23 | — |
| Snowflake | 394 | — |
| Vinyl Acetate | 15 | None |
| Modifier M | 4.3 | — |
| ¼" fibers wt. % | 16 | — |
| Shrinkage Control mils/inch | 0.17 | 0.67 |
| Profilometer MCR | 61 | 49 |

*Example from U.S. Pat. No. 3,830,875, Example No. 3, Table 3a

Although the invention has been described in its preferred forms with a certain degree of particularity, it is understood that the present disclosure has been made only by way of example, and that numerous changes can be made without departing from the spirit of the scope of the invention.

What is claimed is:

1. In a composition containing an unsaturated polyester, a polymerizable ethylenically unsaturated monomer which serves to crosslink the unsaturated polyester to a thermoset product and a thermoplastic polymer low profile additive, the improvement which comprises incorporating into said composition an effective amount of a secondary crosslinkable vinyl monomer having a reactivity ratio $r_1$ with styrene of greater than 1 whereby sheet molding and bulk molding compositions are produced which provide molded articles with superior surface appearance.

2. Composition claimed in claim 1 wherein the secondary vinyl monomer has a reactivity ratio with styrene of greater than 5.

3. Composition claimed in claim 1 wherein the secondary vinyl monomer has a reactivity ratio with styrene of greater than 20.

4. Composition claimed in claim 1 wherein the secondary vinyl monomer is vinyl acetate.

5. Composition claimed in claim 1 wherein the secondary vinyl monomer is vinyl stearate.

6. Composition claimed in claim 1 wherein the secondary vinyl monomer is vinyl norbornene.

7. Composition claimed in claim 1 wherein the secondary vinyl monomer is dicyclopentadiene.

8. Composition claimed in claim 1 wherein the secondary vinyl monomer is butyl vinyl ether.

9. Composition claimed in claim 1 wherein the secondary vinyl monomer is diallyl phthalate.

10. Composition claimed in claim 1 wherein the secondary vinyl monomer has the formula:

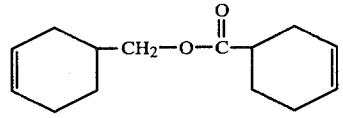

11. Composition claimed in claim 1 containing a thickening amount of a thickening agent.

12. Composition claimed in claim 11 wherein the thickening agent is magnesium oxide.

13. Composition claimed in claim 1 wherein the low profile additive is a polyvinyl acetate.

14. Composition claimed in claim 10 containing a carboxylated polyvinyl acetate low profile additive.

15. Composition claimed in claim 1 containing a reinforcing filler.

16. Composition claimed in claim 14 wherein the reinforcing fiber is glass fiber.

17. Composition claimed in claim 1 containing a rubber or elastomer.

18. A molded article produced from the composition of claims 1 or 10 or 12 or 13 or 14 or 15 or 16.